(No Model.)
P. P. BENSON.
PLANTER.
No. 351,020. Patented Oct. 19, 1886.
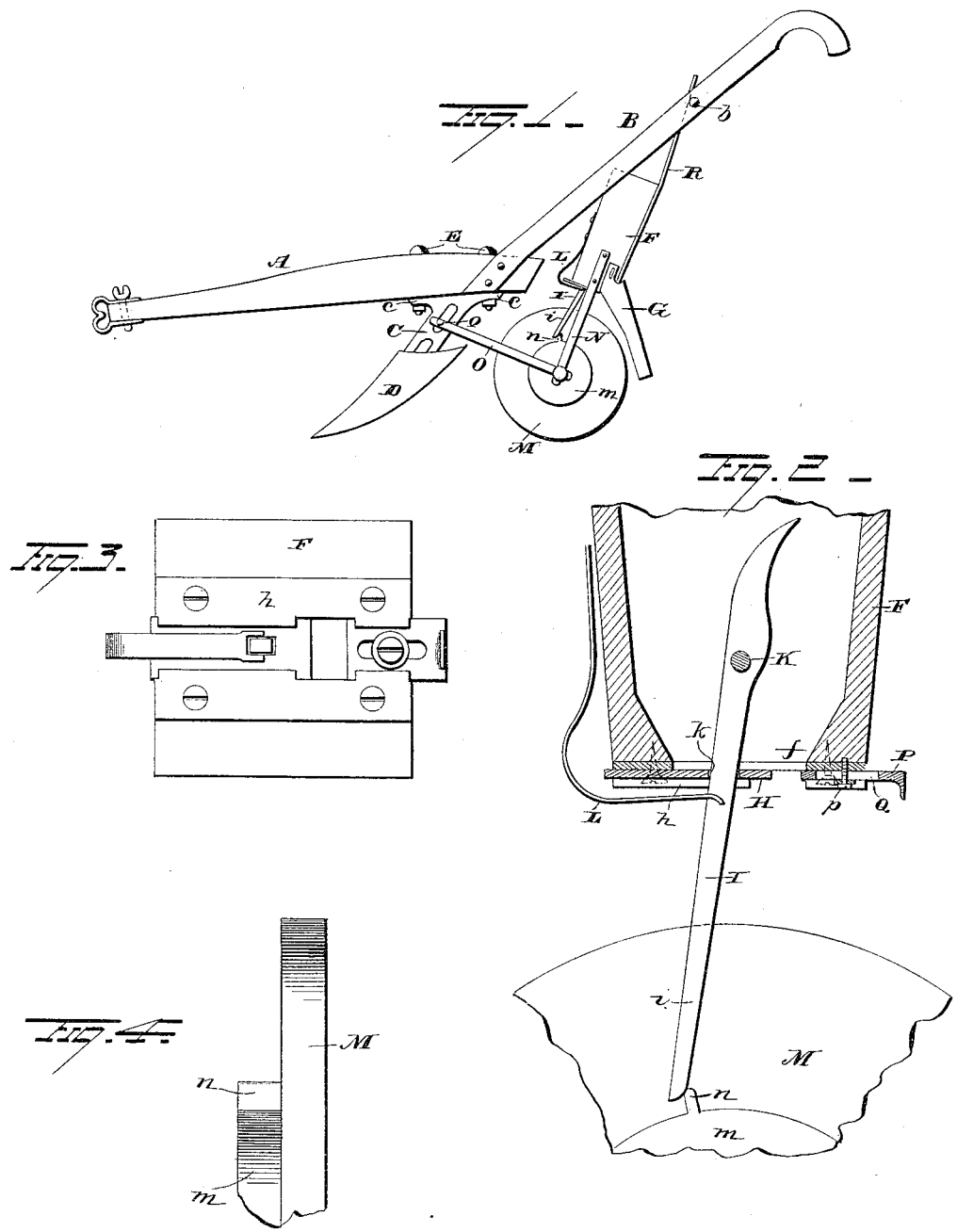
WITNESSES
INVENTOR

United States Patent Office.

PINCKNEY P. BENSON, OF LITTLE ROCK, ARKANSAS.

PLANTER.

SPECIFICATION forming part of Letters Patent No. 351,020, dated October 19, 1886.

Application filed July 1, 1886. Serial No. 206,839. (No model.)

*To all whom it may concern:*

Be it known that I, PINCKNEY P. BENSON, of Little Rock, in the county of Pulaski and State of Arkansas, have invented certain new and useful Improvements in Planters; and I do hereby declare the following to be a full, clear, and exact description of the invention, such as will enable others skilled in the art to which it appertains to make and use the same.

My invention relates to an improvement in planters.

The object is to provide a planter which may be readily attached to and detached from an ordinary plow.

A further object is to provide simple and effective means for regulating the number of kernels or seeds to be deposited in a hill, and further provide a durable and inexpensive planter of light draft and capable of being understood and operated by unskilled laborers.

With these ends in view my invention consists of certain features of construction and combinations of parts, as will be hereinafter described, and pointed out in the claims.

In the accompanying drawings, Figure 1 is a view of the planter attached to a plow in position for use. Fig. 2 is an enlarged vertical section taken through the hopper and showing a portion of the operating-wheel in side elevation. Fig. 3 is a bottom plan view of the hopper, and Fig. 4 is a partial cross-section of the operating-wheel.

A represents the beam, B the handles, C the standard, and D the blade, of a plow.

The plow herein shown is provided with a slotted standard, C, the upper end of which is provided with front and rear flanges, c, which afford an extended bearing for the standard against the under side of the beam, and said flanges c are perforated to receive securing-bolts E, which extend through the beam. The slotted form of standard is not, however, essential, nor is it necessary that the standard should be secured to the under side of the beam; but the construction above shown and described is a simple and convenient one for the attachment of the standard to the beam and for attaching the planter to the standard.

F represents the hopper of the planter. It is preferably of a gradually-flaring form, as shown, and its bottom on the inside is gradually contracted to cause the seed to work down toward the opening $f$, out of which it passes into the spout G, and thence to the ground. Centrally located across the bottom of the hopper is a sliding door, H. It is conveniently secured in position by a pair of ways, $h$, the edges of which are rabbeted out to overlap the edges of the sliding door. An operating-lever, I, is pivotally secured on a bolt or rod, K, extending transversely across the hopper, its long arm $i$ projecting downwardly through a slot, $k$, formed in the sliding door H. A slender spring, L, is secured at one end to the front of the hopper and extends thence down beneath the hopper, its free end resting in contact with the lever I, and its tension tending to hold the arm $i$ of the lever swung toward the rear of the hopper, and hence the sliding door H closed. A wheel, M, provided with a circular projection, $m$, centrally located on one side, is mounted on an axle or in suitable bearings secured on a pair of arms, N, depending from the sides of the hopper. A second pair of arms or braces, O, extend from the axle of the wheel M or from its bearings forwardly to the plow-standard. The circular projection $m$ on the side of the wheel M is provided with one or more pins or lugs, $n$, on its periphery, which are adapted to engage the lower end of the arm $i$ of the lever I as the wheel M rotates, and thereby throw the arm $i$, and hence the sliding door H, toward the front of the hopper and open the door. As soon, however, as the pin or lug $m$ passes the end of the lever the door is closed by the action of the spring L. The distance which the door H is allowed to slide will naturally determine the size of the opening, and hence the number of kernels or seeds which will be deposited at a time. To regulate the said opening to the finest degree a slide, P, is provided, which may be set nearer to or farther from the rear end of the opening by means of a set-screw, $p$, which extends through an elongated slot, Q, in the slide, and into the bottom of the hopper. The spout G covers the opening $f$ and extends downwardly at the rear of the wheel M.

One or more standards, R, secured at their lower ends to the rear side of the hopper, are adapted to extend upwardly between the plow-handles and rest against the front side of one of the cross-braces $b$.

The arms O are adapted to be united at their front ends by one or more bolts, o. One bolt will be sufficient where the standard is slotted; but where it is solid it will be found advantageous to employ one in front of and one at the rear of the standard.

The distance between the hills will be determined by the number of pins or lugs on the wheel M, or the distance between them. The planter may be attached to or removed from the plow by adjusting or releasing the one or two bolts o which lock the arms O to the standard.

It is evident that cams or pins might be employed on the side of the wheel M in the place of the pins or lugs on the projection m, the spout G might be arranged to lead in front of the wheel M, and many other slight changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

1. In a planter, the combination, with a hopper provided with a spring-actuated sliding door at the bottom and a door-operating lever adapted to be actuated by a ground-wheel, of an adjustable slide forming one edge of the seed-opening and adapted to determine the size of the opening made by the sliding door, substantially as set forth.

2. In a planter, the combination, with a hopper and a ground-wheel journaled in a pair of arms depending from the hopper, of the sliding door at the bottom of the hopper, the door-operating lever pivotally secured within the hopper, and the adjustable slide provided with an elongated slot for the reception of a set-screw, substantially as set forth.

3. In a planter, the combination, with the ground-wheel provided with a circular projection on its side and one or more pins or lugs set in the periphery of the circular projection, of the hopper, the arms connecting the ground-wheel and the hopper, the arms or braces connecting the ground-wheel and the plow, and the standard or standards connecting the hopper and the cross-brace between the handles, the whole constructed and arranged substantially as set forth.

In testimony whereof I have signed this specification in the presence of two subscribing witnesses.

PINCKNEY P. BENSON.

Witnesses:
B. P. SMITH,
J. F. LAWS.